United States Patent Office 2,889,352
Patented June 2, 1959

2,889,352

RECOVERY OF TRIMETHYL BORATE FROM METHANOLIC SOLUTIONS THEREOF

Thomas J. Tully, West Caldwell, N.J., assignor, by mesne assignments, to Olin Mathieson Chemical Corporation, a corporation of Virginia No Drawing. Application February 18, 1955
Serial No. 489,292

7 Claims. (Cl. 260—462)

My invention relates to the recovery of trimethyl borate from methanolic solutions thereof and, in particular, provides a process for enriching the trimethyl borate content of such solutions to amounts substantially greater than that which forms the trimethyl borate-methanol azeotrope, thus permitting recovery of substantially pure trimethyl borate from such methanolic solutions by relatively simple methods, such as fractional distillation.

Whether trimethyl borate is prepared by the esterification of methanol with boric acid or boric anhydride, or by transesterification of tri-isoamyl borate with methanol, the distillate from the reaction mixture always contains a rather large amount of methanol along with the trimethyl borate. When the reaction mixture is fractionally distilled, the first part of the distillate is an azeotrope containing approximately 75.5 percent methyl borate and 24.5 percent methanol, which is also approximately an equimolar ratio of the two compounnds. The azeotrope boils at 54.6° C. at 750 mm. pressure. This is lower than the boiling point of any other mixture of trimethyl borate and methanol. Fractional distillation of the esterification mixture never yields a product containing more trimethyl borate than the azeotrope.

In the past, several methods have been used to separate trimethyl borate from the azeotrope. These procedures, for example, involve washing the azeotrope with concentrated sulfuric acid or azeotropic distillation with carbon disulfide.

When the azeotrope is washed with concentrated sulfuric acid, some of the ester is always lost in the acid layer. Although better results can be obtained by washing a solution of the azeotrope in ligroin with sulfuric acid, the loss of ester in the acid layer is still appreciable. The washing must be followed by a distillation to obtain a pure product.

Carbon disulfide also forms an azeotrope with methanol. This boils at 38° C. When a mixture of the trimethyl borate-methanol azeotrope and carbon disulfide is distilled, the azeotrope of methanol and carbon disulfide distills off first leaving a solution of trimethyl borate in carbon disulfide which can be separated by distillation to obtain trimethyl borate. The carbon disulfide-methanol azeotrope contains 14 percent methanol by weight. When it is condensed, it separates into two layers. The bottom layer, consisting of 97 percent carbon disulfide and 3 percent methanol, can be returned to the still. The separation of the carbon disulfide-methanol azeotrope from the trimethyl borate, however, requires a very efficient and slow fractional distillation, since as little as 1.5 percent trimethyl borate in the carbon disulfide-methanol azeotrope prevents it from separating into two layers. This precludes the recycling of the carbon disulfide.

I have now discovered that mineral oils, although soluble to a certain extent in methanol-trimethyl borate solutions, when they are added in excess of their soluble limit and intimately admixed with such trimethyl borate-methanol solutions, yield a mixture which breaks into two phases, one of which, an oil-fat phase, contains trimethyl borate and methanol with the trimethyl borate in a proportion with respect to the methanol greater than the proportion of trimethyl borate in the azeotrope.

In general my invention thus contemplates admixing a mineral oil with trimethyl borate-methanol solutions in a sufficient amount to form such two phase mixtures followed by recovery of the trimethyl borate and methanol from the oil-fat phase. In general I have found that as the amount of mineral oil employed is increased, the oil extract (oil-fat phase) is increasingly richer in ester and the oil-lean phase is increasingly richer in methanol. As a corollary a single extraction with a rather large amount of mineral oil provides more effective separation of methanol and trimethyl borate than several extractions with lesser amounts of oil.

The process of my invention can be applied to enrich the trimethyl borate content of solutions of methanol and trimethyl borate which contain trimethyl borate in any amount. Solutions containing more trimethyl borate than the azeotrope, preferably, are fractionated to recover as much pure trimethyl borate as possible, leaving a solution approximating the azeotrope to be treated by my process.

Any mineral oil can be used, provided it is sufficiently refined to prevent introduction of contaminants. Lighter hydrocarbons, such as kerosene, however, appear to be ineffective to provide adequate separation of trimethyl borate and methanol in two phases to permit concentration of trimethyl borate above azeotropic proportion.

*Example I*

A mixture of 103.9 parts by weight of 99.85% trimethyl borate and 32.0 parts by weight of absolute methanol was prepared. Twenty parts by weight of the mixture were shaken in a separatory funnel for five minutes with 20 parts by weight of U.S.P. mineral oil. Two layers quickly separated but the bottom layer (oil-fat phase) was cloudy. After standing overnight, both layers were clear. The bottom layer was then drawn off and distilled recovering a first fraction boiling at 54°–67° C. which amounted to 5.935 parts by weight and contained 76.73% trimethyl borate. This fraction was essentially azeotrope. The second fraction recovered boiled in the range of 67°–69.5° C. and amounted to 3.903 parts by weight of 100% pure trimethyl borate. The upper layer was then shaken with an additional 20 parts by weight with the same mineral oil. The lower layer which formed was separated as before and distilled to recover two fractions. The first fraction boiled in the range of 52.5°–60° C. and amounted to 1.236 parts by weight and contained 75.83% trimethyl borate. The second fraction boiled in the range of 60°–62° C. and amounted to 0.469 part by weight of which 91.34% was trimethyl borate.

In the preceding example 25.6% of the total weight of trimethyl borate was obtained in the distillation of the first extract. The lower purity second fraction product recovered upon distillation of the second oil extract presumably was due to the lower boiling range of the second fraction. It should be added that the quantities involved in the example were relatively small and consequently a substantial amount of losses were incurred during the transfer of materials from one vessel to another. Considerable stopcock leakage was also experienced in drawing off the first oil-fat phase.

*Example II*

Fifty parts by weight of trimethyl borate-methanol azeotrope containing 75.78% trimethyl borate was admixed and extracted with 100 parts by weight of mineral oil having a density of 0.856 gram per ml. The bottom layer was drawn off and distilled to recover two fractions as in Example I and the top layer was analyzed. The following table describes the results.

Top layer: Weight 8.17 parts.
Analysis:
    34.34% methyl borate
    1.09% mineral oil
    64.57% methanol (by difference)
Bottom layer: Weight 130.96 parts
Distillation:

|  | Boiling range | Weight, parts | Percent methyl borate |
|---|---|---|---|
| Fraction 1 | 54–68 | 22.1 | 91.21 |
| Fraction 2 | 68–78 | 7.0 | 99.50 |

In Example II the combined fractions 1 and 2 could have been distilled to yield roughly 8 parts by weight of azeotrope and 21.1 parts by weight of substantially pure trimethyl borate. It is apparent that 55.7% of the trimethyl borate originally present in the azeotrope could thus be recovered as pure trimethyl borate following the general procedure of Example II.

I claim:
1. A process for enriching the trimethyl borate content of trimethyl borate-methanol solutions which comprises intimately admixing a solution consisting essentially of methanol and trimethyl borate with a refined mineral oil in an amount in excess of the soluble limit of said mineral oil in said solution, whereby the resulting admixture comprises an oil-fat phase containing methanol and trimethyl borate in a proportion with respect to the methanol greater than the proportion of trimethyl borate present in said solution and an oil-lean phase containing methanol and trimethyl borate in a proportion with respect to the methanol less than the proportion of trimethyl borate present in said solution, and recovering said methanol and trimethyl borate from said oil-fat phase.

2. A process for producing methanolic solutions of trimethyl borate containing a greater proportion of trimethyl borate than that proportion which forms an azeotropic mixture with methanol from methanolic solutions containing a proportion of trimethyl borate up to that proportion which forms an azeotropic mixture which comprises intimately admixing a solution consisting essentially of methanol and trimethyl borate in a proportion not exceeding that which forms an azeotropic mixture with the methanol with a refined mineral oil in an amount in excess of the soluble limit of said mineral oil in said solution, whereby the resulting admixture comprises an oil-fat phase containing methanol and trimethyl borate in a proportion with respect to the methanol which is greater than that proportion of trimethyl borate which forms an azeotropic mixture with methanol and an oil-lean phase containing methanol and trimethyl borate in a proportion with respect to the methanol less than the proportion of trimethyl borate present in said solution, and recovering said methanol and trimethyl borate from said oil-fat phase.

3. A process according to claim 2 in which said methanol and trimethyl borate are recovered from said oil-fat phase by distillation.

4. A process for producing essentially pure trimethyl borate from methanolic solutions thereof which comprises intimately admixing a solution consisting essentially of methanol and trimethyl borate in a proportion not exceeding that which forms an azeotropic mixture with the methanol and a refined mineral oil in an amount in excess of the soluble limit of said mineral oil in said solution, whereby the resulting admixture comprises an oil-fat phase containing methanol and trimethyl borate in a proportion with respect to the methanol which is greater than that proportion of trimethyl borate which forms an azeotropic mixture with methanol and an oil-lean phase containing methanol and trimethyl borate in a proportion with respect to the methanol less than the proportion of trimethyl borate present in said solution, and recovering said methanol and trimethyl borate from said oil-fat phase by fractional distillation, separating a first fraction consisting essentially of methanol and trimethyl borate in a proportion approximating that of the azeotropic mixture of methanol and trimethyl borate and separating a second fraction having a higher boiling range than said first fraction and consisting of substantially pure trimethyl borate.

5. A process according to claim 1 in which said refined mineral oil is U.S.P. mineral oil.

6. A process according to claim 2 in which said refined mineral oil is U.S.P. mineral oil.

7. A process according to claim 4 in which said refined mineral oil is U.S.P. mineral oil.

References Cited in the file of this patent
UNITED STATES PATENTS

| 2,689,259 | Schechter | Sept. 14, 1954 |
| 2,746,984 | Rottig et al. | May 22, 1956 |
| 2,802,018 | Ton | Aug. 6, 1057 |

OTHER REFERENCES

Schlesinger et al.: J. Am. Chem. Society, vol. 75, pages 213–215 (1953).